United States Patent
Tao et al.

(10) Patent No.: US 11,501,759 B1
(45) Date of Patent: Nov. 15, 2022

(54) METHOD, SYSTEM FOR SPEECH RECOGNITION, ELECTRONIC DEVICE AND STORAGE MEDIUM

(71) Applicant: INSTITUTE OF AUTOMATION, CHINESE ACADEMY OF SCIENCES, Beijing (CN)

(72) Inventors: Jianhua Tao, Beijing (CN); Zhengkun Tian, Beijing (CN); Jiangyan Yi, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/868,507

(22) Filed: Jul. 19, 2022

(30) Foreign Application Priority Data

Dec. 22, 2021 (CN) .......................... 202111577269.2

(51) Int. Cl.
*G10L 15/08* (2006.01)
*G10L 15/00* (2013.01)
*G10L 15/26* (2006.01)

(52) U.S. Cl.
CPC ............ *G10L 15/08* (2013.01); *G10L 15/005* (2013.01); *G10L 15/26* (2013.01)

(58) Field of Classification Search
CPC ........ G10L 15/08; G10L 15/005; G10L 15/26
(Continued)

(56) References Cited

U.S. PATENT DOCUMENTS 5,245,662 A * 9/1993 Taniguchi ............. G10L 19/107
704/223
5,699,482 A * 12/1997 Adoul ..................... G10L 19/12
704/223
(Continued)

FOREIGN PATENT DOCUMENTS

CN 105931633 A 9/2016
CN 107039042 A 8/2017
(Continued)

OTHER PUBLICATIONS

First Office Action issued in counterpart Chinese Patent Application No. 202111577269.2, dated Jan. 28, 2022.
(Continued)

*Primary Examiner* — Thuykhanh Le
(74) *Attorney, Agent, or Firm* — Westbridge IP LLC

(57) ABSTRACT

Disclosed are a method and a system for speech recognition, an electronic device and a storage medium, which relates to the technical field of speech recognition. Embodiments of the application comprise performing encoded representation on an audio to be recognized to obtain an acoustic encoded state vector sequence of the audio to be recognized; performing sparse encoding on the acoustic encoded state vector sequence of the audio to be recognized to obtain an acoustic encoded sparse vector; determining a text prediction vector of each label in a preset vocabulary; recognizing the audio to be recognized and determining a text content corresponding to the audio to be recognized according to the acoustic encoded sparse vector and the text prediction vector. The acoustic encoded sparse vector of the audio to be recognized is obtained by performing sparse encoding on the acoustic encoded state vector of the audio to be recognized.

10 Claims, 6 Drawing Sheets

(58) Field of Classification Search
USPC ........................................................ 704/222
See application file for complete search history.

(56) References Cited

U.S. PATENT DOCUMENTS

| | | | | |
|---|---|---|---|---|
| 5,799,131 | A * | 8/1998 | Taniguchi | G10L 19/083 |
| | | | | 704/223 |
| 9,299,347 | B1 * | 3/2016 | Siohan | G10L 15/20 |
| 9,378,733 | B1 * | 6/2016 | Vanhoucke | G10L 15/08 |
| 9,489,962 | B2 * | 11/2016 | Chong | G10L 19/20 |
| 9,583,117 | B2 * | 2/2017 | Krishnan | G10L 19/20 |
| 9,620,145 | B2 * | 4/2017 | Bacchiani | G10L 25/30 |
| 9,761,239 | B2 * | 9/2017 | Wang | G10L 19/22 |
| 2002/0111801 | A1 * | 8/2002 | Wu | G10L 19/00 |
| | | | | 704/E19.02 |
| 2009/0187409 | A1 * | 7/2009 | Krishnan | G10L 19/20 |
| | | | | 704/E19.005 |
| 2011/0035215 | A1 | 2/2011 | Sompolinsky et al. | |
| 2012/0053948 | A1 | 3/2012 | Mustiere et al. | |
| 2012/0316886 | A1 * | 12/2012 | Pishehvar | G10L 19/032 |
| | | | | 704/500 |
| 2014/0188487 | A1 * | 7/2014 | Perez Gonzalez | G10L 19/00 |
| | | | | 704/500 |
| 2014/0350922 | A1 * | 11/2014 | Ohtani | G10L 25/18 |
| | | | | 704/205 |
| 2015/0371631 | A1 * | 12/2015 | Weinstein | G10L 15/08 |
| | | | | 704/256.4 |
| 2016/0099008 | A1 * | 4/2016 | Barker | H04R 25/505 |
| | | | | 704/233 |
| 2016/0171977 | A1 * | 6/2016 | Siohan | G10L 15/02 |
| | | | | 704/237 |
| 2016/0240206 | A1 * | 8/2016 | Purnhagen | G10L 19/008 |
| 2016/0372139 | A1 * | 12/2016 | Cho | G06F 16/00 |
| 2017/0178659 | A1 * | 6/2017 | Moriya | H03M 7/30 |
| 2018/0067558 | A1 * | 3/2018 | Eagleman | G10L 15/16 |
| 2018/0130491 | A1 * | 5/2018 | Mathur | G11B 20/00992 |
| 2018/0137857 | A1 * | 5/2018 | Zhou | G10L 15/02 |
| 2018/0315431 | A1 * | 11/2018 | Badr | G10L 25/84 |
| 2020/0106708 | A1 * | 4/2020 | Sleevi | H04L 65/80 |
| 2020/0176007 | A1 * | 6/2020 | Moriya | G10L 19/22 |
| 2020/0357392 | A1 * | 11/2020 | Zhou | G10L 15/1822 |
| 2022/0150627 | A1 * | 5/2022 | Zhou | H04R 3/005 |

FOREIGN PATENT DOCUMENTS

| | | |
|---|---|---|
| CN | 109213988 A | 1/2019 |
| CN | 113327597 A | 8/2021 |
| CN | 113488028 A | 10/2021 |
| CN | 113823264 A | 12/2021 |

OTHER PUBLICATIONS

Ni et al., Improving Accented Mandarin Speech Recognition by Using Recurrent Neural Network based Language Model Adaptation, IEEE 2016 10th International Symposium on Chinese Spoken Language Processing (ISCSLP), Tianjin, China, dated Oct. 20, 2016.

Zhao, Application of Convolutional Neural Network Based on Sparse Coding in Speech Recognition, Information & Communications, Sum. No 194, pp. 100-101, dated Feb. 15, 2019.

* cited by examiner

ABOUT US 11,501,759 B1

METHOD, SYSTEM FOR SPEECH RECOGNITION, ELECTRONIC DEVICE AND STORAGE MEDIUM

CROSS-REFERENCE TO RELATED APPLICATIONS

The present disclosure claims priority to Chinese Patent Application 202111577269.2, entitled "Method, system for speech recognition, electronic device and storage medium", filed on Dec. 22, 2021, the entire content of which is incorporated herein by reference.

TECHNICAL FIELD

The application relates to the technical field of speech recognition, in particular to a method and a system for speech recognition, an electronic device and a storage medium.

BACKGROUND

Transducer-based speech recognition model has important application value in the field of streaming speech recognition, and its typical characteristic is that it can directly adapt to streaming speech recognition tasks. It uses frame-by-frame calculation method for training and reasoning. Although this method can be directly applied to streaming speech recognition tasks, it also brings two problems:

First, the probability distribution of labels needs to be calculated separately for each frame of speech fragment, which causes great memory consumption and computation in the training process, resulting in low computational efficiency;

Second, the model needs frame-by-frame reasoning in the reasoning process. Large amount of calculation exists since there are too many speech frames in an audio (typical one second contains 100 audio frames), so that the reasoning speed is slow.

SUMMARY

In order to solve the above technical problems or at least partially solve the above technical problems, embodiments of the present application provide a method and a system for speech recognition, an electronic device and a computer readable storage medium.

In a first aspect, the embodiment of the application provides a method for speech recognition, which includes performing encoded representation on an audio to be recognized to obtain an acoustic encoded state vector sequence of the audio to be recognized; performing sparse encoding on the acoustic encoded state vector sequence of the audio to be recognized to obtain an acoustic encoded sparse vector; determining a text prediction vector of each label in a preset vocabulary; recognizing the audio to be recognized and determining a text content corresponding to the audio to be recognized according to the acoustic encoded sparse vector and the text prediction vector.

In an alternative embodiment, performing sparse encoding on the acoustic encoded state vector sequence of the audio to be recognized to obtain the acoustic encoded sparse vector, includes: calculating a probability that each acoustic encoded state vector in the acoustic encoded state vector sequence is mapped to each label in the preset vocabulary, and determining a segmentation point according to the probability; segmenting the acoustic encoded state vector sequence based on the segmentation point to obtain an acoustic encoded segmentation sequence; performing sparse encoding on the acoustic encoded segmentation sequence to obtain an acoustic encoded sparse vector.

In an alternative embodiment, performing encoded representation on the audio to be recognized to obtain the acoustic encoded state vector sequence of the audio to be recognized includes: acquiring acoustic features of the audio to be recognized; performing encoded representation on the acoustic features of the audio to be recognized to obtain the acoustic encoded state vector sequence of the audio to be recognized.

In an alternative embodiment, the labels include space labels and non-space labels; calculating the probability that each acoustic encoded state vector in the acoustic encoded state vector sequence is mapped to each label in the preset vocabulary, and determining the segmentation point according to the probability includes: performing linear mapping on each acoustic encoded state vector in the acoustic encoded state vector sequence, and determining the probability distribution of mapping the acoustic encoded state vector to each label in the preset vocabulary; determining the probability that the acoustic encoded state vector is mapped to the non-space label set according to the probability distribution; determining a segmentation point according to the probability that the acoustic encoded state vector is mapped to the non-space label set.

In an alternative embodiment, determining the segmentation point according to the probability that the acoustic encoded state vector is mapped to the non-space label set includes: marking the acoustic encoded state vector whose probability of the non-space label set is greater than a preset threshold value as a trigger peak; marking the middle position of two adjacent trigger peaks as the segmentation point.

In an alternative embodiment, the method further includes performing sparse encoding on the acoustic encoded segmentation sequence to obtain the acoustic encoded sparse vector according to the following formula:

$$e_i = \text{Linear}(A_i)$$
$$\alpha_i = \exp(e_i) / \sum_{j=l}^{r} \exp(e_j)$$
$$\hat{A}_k = \sum_{t=l}^{r} \alpha_i A_t$$

wherein, $A_i$ represents the acoustic encoded segmentation sequence, Linear represents a linear encoding function, $e_i$ represents the energy value of the acoustic encoded segmentation sequence after being encoded by the encoding function Linear, $\alpha_i$ represents a weight coefficient obtained by normalizing the energy value $e_i$, $e_j$ represents the energy value at time j, $A_t$ represents the acoustic encoded state vector at time t, $\hat{A}_k$ represents performing weighted sum on the acoustic encoded segmentation sequence according to the weight coefficient $\alpha_i$ to obtain an acoustic encoded sparse vector, k represents the k-th acoustic encoded segmentation sequence, and l and r respectively represent the starting time and the ending time of the acoustic encoded segmentation sequence.

In a second aspect, the embodiment of the application provides a system for speech recognition, the system for speech recognition includes an acoustic encoder, a language predictor, a joint network, and a sparse encoding layer;

wherein, the acoustic encoder is configured for performing encoded representation on an audio to be recognized to obtain an acoustic encoded state vector sequence of the audio to be recognized;

the sparse encoding layer is configured for performing sparse encoding on the acoustic encoded state vector sequence of the audio to be recognized to obtain an acoustic encoded sparse vector;

the language predictor is configured for determining a text prediction vector of each label in a preset vocabulary;

the joint network is configured for recognizing the audio to be recognized and determining a text content corresponding to the audio to be recognized according to the acoustic encoded sparse vector and the text prediction vector.

In an alternative embodiment, the sparse encoding layer includes a CTC prediction layer and an acoustic state sparse layer;

the CTC prediction layer is configured for calculating a probability that each acoustic encoded state vector in the acoustic encoded state vector sequence is mapped to each label in the preset vocabulary, and determining a segmentation point according to the probability; segmenting the acoustic encoded state vector sequence based on the segmentation point to obtain an acoustic encoded segmentation sequence;

the acoustic state sparse layer is configured for performing sparse encoding on the acoustic encoded segmentation sequence to obtain an acoustic encoded sparse vector.

In an alternative embodiment, the acoustic encoder is further configured for: acquiring acoustic features of the audio to be recognized; performing encoded representation on the acoustic features of the audio to be recognized to obtain the acoustic encoded state vector sequence of the audio to be recognized.

In an alternative embodiment, the labels include space labels and non-space labels;

the CTC prediction layer is configured for: performing linear mapping on each acoustic encoded state vector in the acoustic encoded state vector sequence, and determining the probability distribution of mapping the acoustic encoded state vector to each label in the preset vocabulary; determining the probability that the acoustic encoded state vector is mapped to the non-space label set according to the probability distribution; determining a segmentation point according to the probability that the acoustic encoded state vector is mapped to the non-space label set.

In an alternative embodiment, the CTC prediction layer is configured for: marking the acoustic encoded state vector whose probability of the non-space label set is greater than a preset threshold value as a trigger peak; marking the middle position of two adjacent trigger peaks as the segmentation point.

In an alternative embodiment, the acoustic state sparse layer is configured for performing sparse encoding on the acoustic encoded segmentation sequence to obtain the acoustic encoded sparse vector according to the following formula:

$$e_i = \text{Linear}(A_i)$$

$$\alpha_i = \exp(e_i)/\sum_{j=l}^{r}\exp(e_j)$$

$$\hat{A}_k = \sum_{t=l}^{r}\alpha_i A_t$$

wherein, $A_i$ represents the acoustic encoded segmentation sequence, Linear represents a linear encoding function, $e_i$ represents the energy value of the acoustic encoded segmentation sequence after being encoded by the encoding function Linear, $\alpha_i$ represents a weight coefficient obtained by normalizing the energy value $e_i$, $e_j$ represents the energy value at time j, $A_t$ represents the acoustic encoded state vector at time t, $\hat{A}_k$ represents performing weighted sum on the acoustic encoded segmentation sequence according to the weight coefficient $\alpha_i$ to obtain an acoustic encoded sparse vector, k represents the k-th acoustic encoded segmentation sequence, and l and r respectively represent the starting time and the ending time of the acoustic encoded segmentation sequence.

In a third aspect, the embodiment of the present application also provides an electronic device, which includes a processor, a communication interface, a memory and a communication bus, wherein the processor, the communication interface and the memory communicate with each other through the communication bus; the memory is for storing at least one executable instruction, and the executable instruction makes the processor execute the following steps: performing encoded representation on an audio to be recognized to obtain an acoustic encoded state vector sequence of the audio to be recognized; performing sparse encoding on the acoustic encoded state vector sequence of the audio to be recognized to obtain an acoustic encoded sparse vector; determining a text prediction vector of each label in a preset vocabulary; recognizing the audio to be recognized and determining a text content corresponding to the audio to be recognized according to the acoustic encoded sparse vector and the text prediction vector.

In a fourth aspect, the embodiment of the application also provides a non-transitory computer-readable storage medium with a computer program stored thereon, wherein the computer program, when executed by a processor, implements the method for speech recognition according to the embodiment of the application.

One or more technical solutions in the above embodiments have at least some or all of the following advantages: the acoustic encoded sparse vector of the audio to be recognized is obtained by performing sparse encoding on the acoustic encoded state vector of the audio to be recognized, thereby reducing the number of coding frames to reduce the calculation cost and improving the speed of speech recognition. More specifically, the embodiment of the application firstly divides a continuous speech to be recognized audio to be recognized, carries out sparse encoding on the audio frames within each division to obtain sparse frames, and decodes the sparse frames, so as to reduce the number of decoding steps and the amount of calculation, thereby speeding up the speech recognition speed.

BRIEF DESCRIPTION OF THE DRAWINGS

The accompanying drawings herein, which are incorporated into the specification and constitute a part of the specification, show embodiments in accordance with the present disclosure and serve to explain the principle of the present disclosure together with the specification.

In order to describe the technical solutions more clearly in the embodiments of the present disclosure or the prior art, the accompanying drawings necessarily used for the description of the embodiments or related art will be briefly introduced in the following. It is obvious for those of ordinary skill in the art to obtain other accompanying drawings from these accompanying drawings without paying creative labor.

DETAILED DESCRIPTION OF THE EMBODIMENTS

In order to make the objects, technical aspects and advantages of the embodiments of the application clearer, the technical aspects of the embodiments of the application will be clearly and completely described below in conjunction with the accompanying drawings in the embodiments of the application, and it will be obvious that the described embodiments are part of the embodiments of the application, but not all of them. Based on the embodiments in the present application, all other embodiments obtained by those of ordinary skill in the art without making creative efforts are within the scope of protection of the present application.

Traditional Transducer speech recognition model usually includes three parts: an acoustic encoder, a language predictor and a joint network. The acoustic encoder is responsible for encoding the input acoustic features into acoustic encoded state vectors. The input of the language predictor is a space label or a text label in a preset vocabulary. The output is the text prediction state vector predicted at the current time, and the input of the combined network is the acoustic encoded state vector output by the acoustic encoder at the current time and the text prediction state vector output by the language predictor, and the output is the probability of all the text labels in the vocabulary. However, this model performs training and reasoning by using a frame-by-frame method, which leads to great memory consumption, large amount of computation and slow recognition efficiency. To solve the above technical problems, embodiments of the application provides a method for speech recognition and a system for speech recognition. The method and the system change the calculation mode of the traditional Transducer speech recognition model, and sparsely represent the encoded state of the audio, thereby reducing the number of encoding frames for the model to participate in subsequent training and reasoning, and realizing the functions of reducing the calculation cost and improving the speed.

Figure 1:
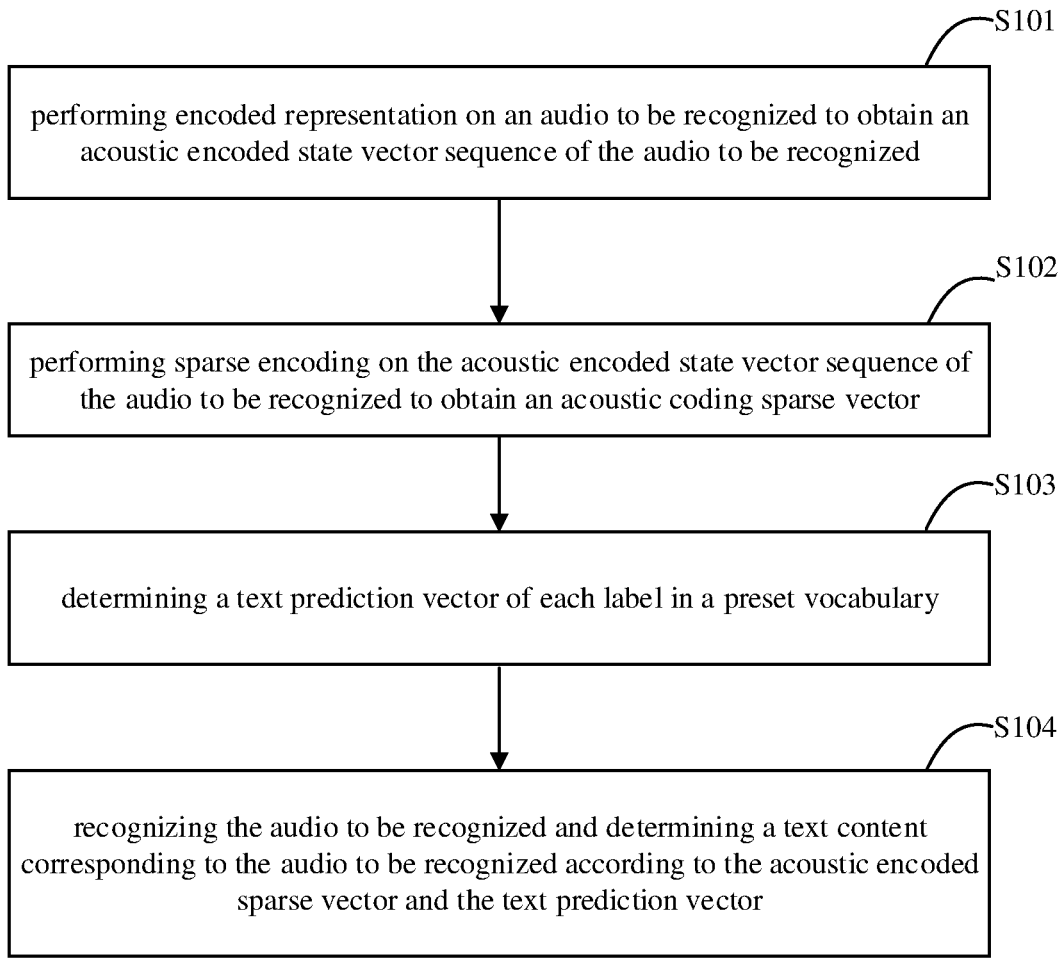
FIG. 1 schematically illustrates a flowchart of the main steps of a method for speech recognition according to an embodiment of the present application.

FIG. 1 schematically illustrates a flowchart of the main steps of a method for speech recognition according to an embodiment of the present application.

As shown in FIG. 1, the method for speech recognition includes:

step S101: performing encoded representation on an audio to be recognized to obtain an acoustic encoded state vector sequence of the audio to be recognized;

step S102: performing sparse encoding on the acoustic encoded state vector sequence of the audio to be recognized to obtain an acoustic encoded sparse vector;

step S103: determining a text prediction vector of each label in a preset vocabulary;

step S104: recognizing the audio to be recognized and determining a text content corresponding to the audio to be recognized according to the acoustic encoded sparse vector and the text prediction vector.

Figure 2:
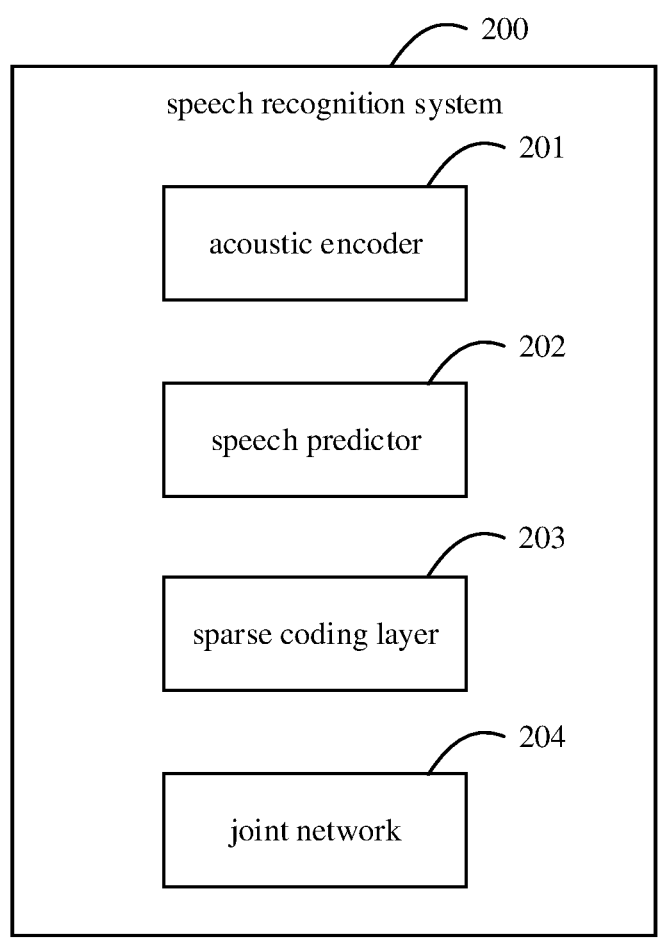
FIG. 2 schematically illustrates a schematic diagram of main modules of a system for speech recognition according to an embodiment of the present application.

The method for speech recognition can be applied to the system for speech recognition 200 as shown in FIG. 2. As shown in FIG. 2 the system for speech recognition 200 includes an acoustic encoder 201 a speech predictor 202 a sparse encoding layer 203 and a joint network 204.

For step S101, the encoded representation of the audio to be recognized includes performing the encoded representation of acoustic features of the audio to be recognized. Thus, the step includes acquiring the acoustic features of the audio to be recognized, performing the encoded representation of acoustic features of the audio to be recognized to obtain an acoustic encoded state vector sequence of the audio to be recognized. The acoustic features of the audio to be recognized may be, for example, MFCC features, FBank features, etc. MFCC (Mel-Frequency Cepstral Coefficients) and FBank (Filterbank) features are commonly used in speech recognition. After obtaining the acoustic features of the audio to be recognized, the acoustic features of the audio to be recognized are represented in an encoded way, and an acoustic encoded state vector of the audio to be recognized is obtained.

In conjunction with FIG. 2, the audio to be recognized may be inputted into the acoustic encoder 201 of the system for speech recognition 200 for encoded representation, to obtain a sequence of acoustic encoded state vectors. In alternative embodiments, the acoustic encoder may be constructed by using a structure or combination structure based on a cyclic neural network, a convolutional neural network, or a Transformer model and variants or combinations of these models.

Figure 3:
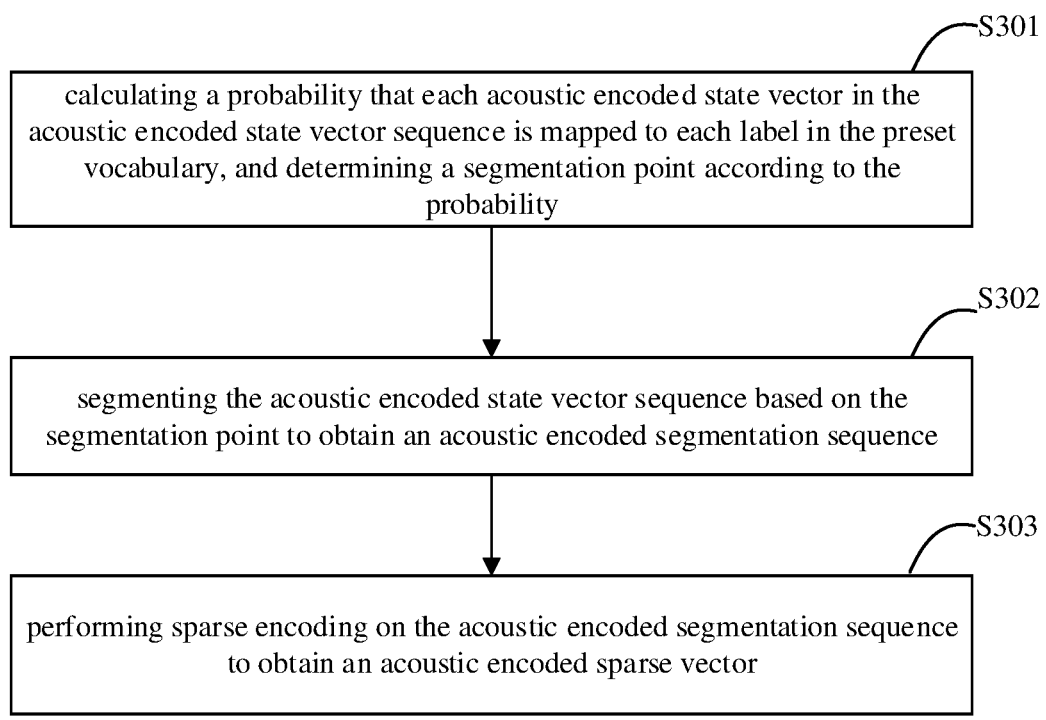
FIG. 3 schematically shows a schematic diagram of a subflow of a method for speech recognition according to an embodiment of the present.

In step S102, the acoustic encoded state vector sequence of the audio to be recognized is sparsely encoded to obtain an acoustic encoded sparse vector, and subsequent calculation based on the acoustic encoded sparse vector can realize the effect of representing as much knowledge as possible with as few resources as possible, thereby improving the calculation efficiency. As shown in FIG. 3, this step includes the following sub-steps:

step S301: calculating a probability that each acoustic encoded state vector in the acoustic encoded state vector sequence is mapped to each label in the preset vocabulary, and determining a segmentation point according to the probability;

step S302: segmenting the acoustic encoded state vector sequence based on the segmentation point to obtain an acoustic encoded segmentation sequence;

step S303: performing sparse encoding on the acoustic encoded segmentation sequence to obtain an acoustic encoded sparse vector.

Figure 4:
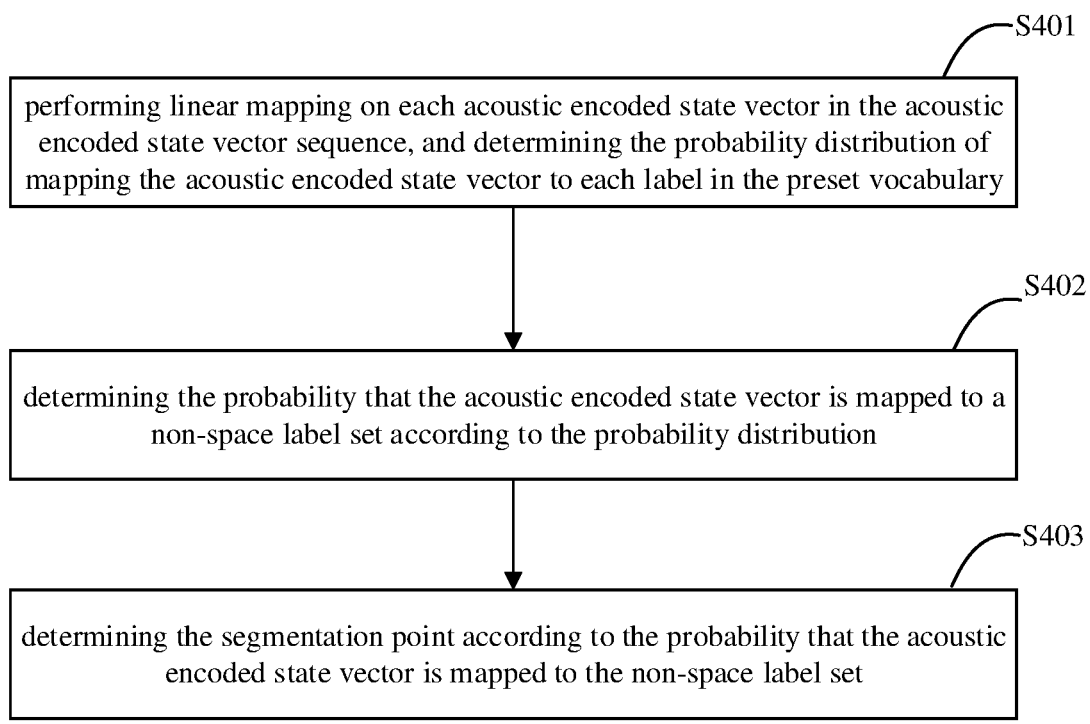
FIG. 4 schematically shows a schematic diagram of another sub-flow of a method for speech recognition according to an embodiment of the present application.

In this embodiment, a label (also referred to as a label) includes a space label and a non-space label, and the space label and the non-space label can be recorded in the preset vocabulary. As shown in FIG. 4, the specific steps for determining the segmentation point include:

step S401: performing linear mapping on each acoustic encoded state vector in the acoustic encoded state vector sequence, and determining the probability distribution of mapping the acoustic encoded state vector to each label in the preset vocabulary;

step S402: determining the probability that the acoustic encoded state vector is mapped to the non-space label set according to the probability distribution;

step S403: determining a segmentation point according to the probability that the acoustic encoded state vector is mapped to the non-space label set.

In the embodiment, the probability that the acoustic encoded state vector is mapped to a space label and a non-space label can be calculated and obtained through linear mapping, thereby obtaining the probability distribution of mapping the acoustic encoded state vector to each label. Then, the calculated probability of the blank label is taken out, and the probability of the non-blank label set is calculated according to the following formula:

$$p(nBLK|A_t) = 1 - p(BLK|A_t)$$

Here, $A_t$ represents an acoustic encoded state vector at time t, BLK represents a space label, nBLK represents a set of non-space labels, $p(BLK|A_t)$ represents the probability of space labels, $p(nBLK|A_t)$ represents the probability of a set of non-space labels.

After predicting and obtaining the probability of the set of non-space labels corresponding to the acoustic encoded state vectors of the audio to be recognized, a segmentation point can be determined according to the probability, so as to segment the acoustic encoded state vector sequence into acoustic encoded segmentation sequences of different lengths according to the segmentation point. Here, the step of determining the segmentation point according to the probability includes the following steps: marking the acoustic encoded state vector whose probability of the non-space label set is greater than a preset threshold value as a trigger peak; marking the middle position of two adjacent trigger peaks as a segmentation point. As an example, the preset threshold value may be 0.5. That is, if the probability of the set of non-space labels is greater than 0.5, it is marked as a trigger spike. Then, the middle position of two adjacent trigger peaks is recorded as a segmentation point, and the encoded state vector sequence is segmented into the acoustic encoded segmentation sequences of different lengths based on the segmentation point.

After obtaining the acoustic encoded segmentation sequence, the acoustic encoded state vector in the acoustic encoded segmentation sequence is further sparsely encoded as follows:

$$e_i = \text{Linear}(A_i)$$

$$\alpha_i = \exp(e_i) / \sum_{j=l}^{r} \exp(e_j)$$

$$\hat{A}_k = \sum_{t=l}^{r} \alpha_i A_t$$

Here, $A_i$ represents the acoustic encoded segmentation sequence, Linear represents a linear encoding function, $e_i$ represents the energy value of the acoustic encoded segmentation sequence after being encoded by the encoding function Linear, $\alpha_i$ represents a weight coefficient obtained by normalizing the energy value $e_i$, $e_j$ represents the energy value at time j, $A_t$ represents the acoustic encoded state vector at time t, $\hat{A}_k$ represents performing weighted sum on the acoustic encoded segmentation sequence according to a weight coefficient $\alpha_i$, to obtain an acoustic encoded sparse vector, k represents the k-th acoustic encoded segmentation sequence, and l and r respectively represent the starting time and the ending time of the acoustic encoded segmentation sequence.

In conjunction with FIG. 2, the sequence of acoustic encoded state vectors of the audio to be recognized can be sparsely encoded by the sparse encoding layer 203 of the system for speech recognition 200, to obtain the acoustic encoded sparse vector.

Figure 5:
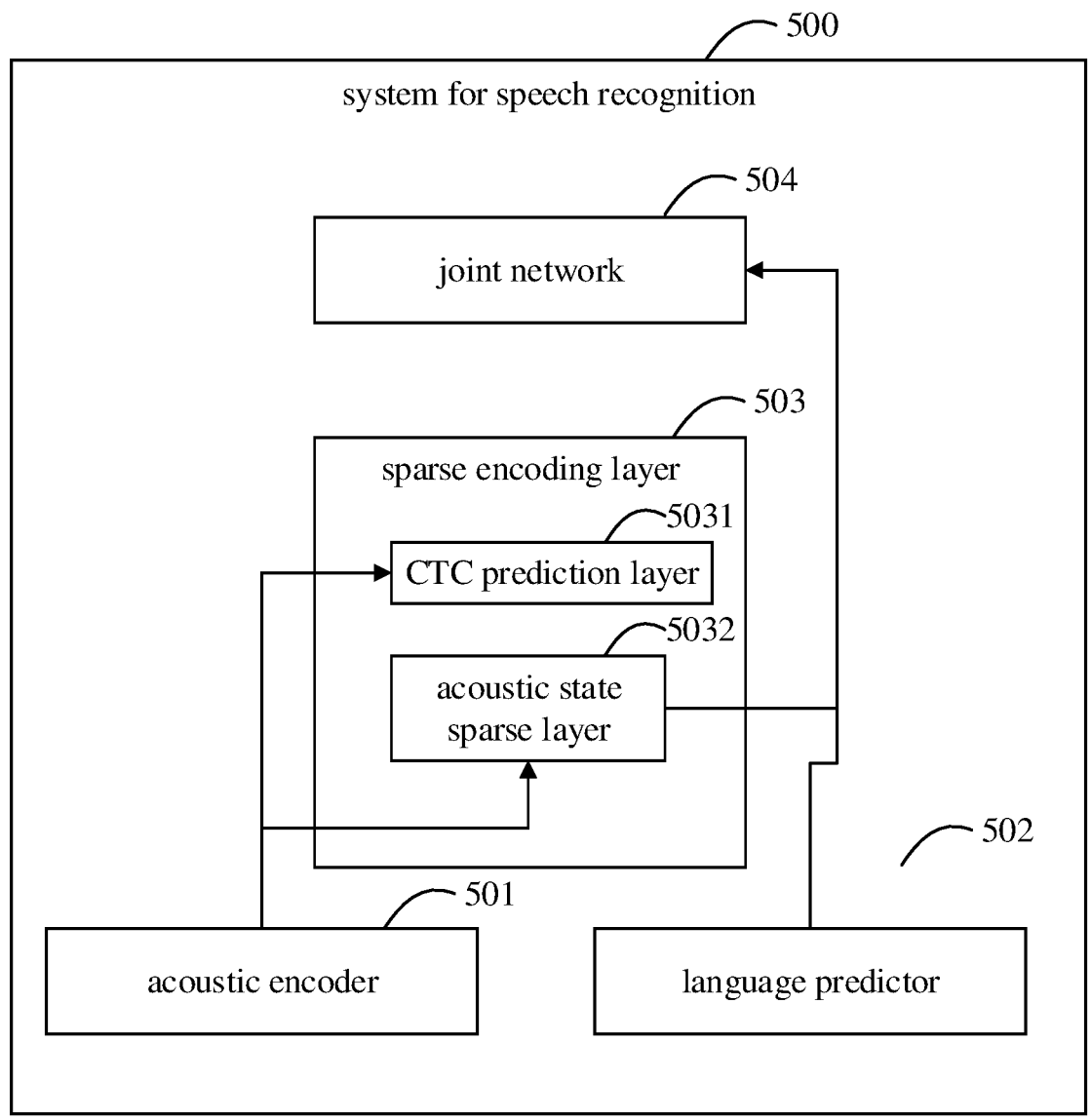
FIG. 5 schematically shows a structural diagram of a system for speech recognition according to an embodiment of the present application.

In an alternative embodiment, as shown in FIG. 5, a system for speech recognition 500 includes an acoustic encoder 501, a language predictor 502, a joint network 504 and a sparse encoding layer 503, the sparse encoding layer 503 includes a CTC prediction layer 5031 and an acoustic state sparse layer 5032, the CTC prediction layer 5031 is configured for calculating a probability that each acoustic encoded state vector in the sequence of acoustic encoded state vectors is mapped to each label in the preset vocabulary, and the segmentation point is determined according to the probability; the acoustic encoded state vector sequence is segmented to obtain an acoustic encoded segmentation sequence based on the segmentation points. The CTC prediction layer 5031 can be implemented using a CTC (Connectionist Temporal Classification) model. It is a kind of end-to-end speech recognition model. Its typical characteristic is that the modeling unit contains space labels, and the non-space probability distribution output by the model presents a peak state. The peak indicates that the probability of predicting a certain output label is very high, which approaches 1, and the position of the peak is usually located in the pronunciation range of the corresponding output label. The acoustic state sparse layer 5032 is configured for sparsely encoding the acoustic encoded segmentation sequence to obtain an acoustic encoded sparse vector.

For step S103, in conjunction with FIG. 2, a text prediction vector for each label may be determined by a pre-trained language predictor 202 in the system for speech recognition 200. Here, the label includes a space label and a non-space label. In this embodiment, the language predictor acts like a language model, achieving the effect of modeling the dependencies between labels. The language predictor models the dependency relationship between labels mainly according to its principle, which uses the previously predicted labels as input, to predict and obtain the text prediction vector through forward calculation, and the text prediction vector are subjected to calculation by the joint network to obtain new labels, and then the new labels are inputted into the language predictor, and this process is repeated. However, no non-space labels are predicted by the model at the starting position. At this time, the language predictor uses space labels as input, which acts like a starting label here, so that the model can run normally.

For Step S104, in conjunction with FIG. 2, the acoustic encoded sparse vector and the text prediction vector are inputted into the joint network 204, the probability distribution of the output label is calculated, and the text content corresponding to the audio to be recognized is determined according to the probability distribution. The system for speech recognition in the embodiment of the application decodes from left to right along the time axis. In the training process of system for speech recognition, the joint network uses acoustic coded sparse sequence and text prediction sequence to construct a training probability graph. On the graph, the forward and backward algorithm based on dynamic programming is used to sum the probabilities of all possible text label-audio feature alignment paths of the model, and the negative logarithmic loss is calculated for optimization. In the process of reasoning, the probability distribution of labels is obtained by joint network calculation. If the highest probability in the probability distribution is a space label, since the space label does not have any language information, the text prediction vector is kept unchanged and the input acoustic encoded sparse vector is updated. If the maximum probability in the probability distribution is a non-space label, the text prediction vector is updated, and the acoustic encoded sparse vector is kept unchanged, and decoding is continued until a stop condition is reached.

In the method for speech recognition according to the embodiment of the application, the acoustic encoded sparse vector of the audio to be recognized is obtained by performing sparse encoding on the acoustic encoded state vector of the audio to be recognized, thereby reducing the number of coding frames to reduce the calculation cost and improving the speed of speech recognition. The method for speech recognition of the embodiment of the application fundamentally realized the optimization of the calculation amount of the Transducer model, which can be applied to, the two processes, training and reasoning processes of the model, improves the training efficiency, reduces the consumption of video memory in the training process, reduces the number of reasoning steps and improves the reasoning speed. The method for speech recognition of the embodiment of the application aims at the change of the calculation mode of the Transducer model, which has little change to the structure and can be applied to a variety of existing Transducer models. More specifically, the embodiment of the application firstly divides a continuous speech to be recognized audio to be recognized, carries out sparse encoding on the audio frames within each division to obtain sparse frames, and decodes the sparse frames, so as to reduce the number of decoding steps and the amount of calculation, thereby speeding up the speech recognition speed.

Figure 6:
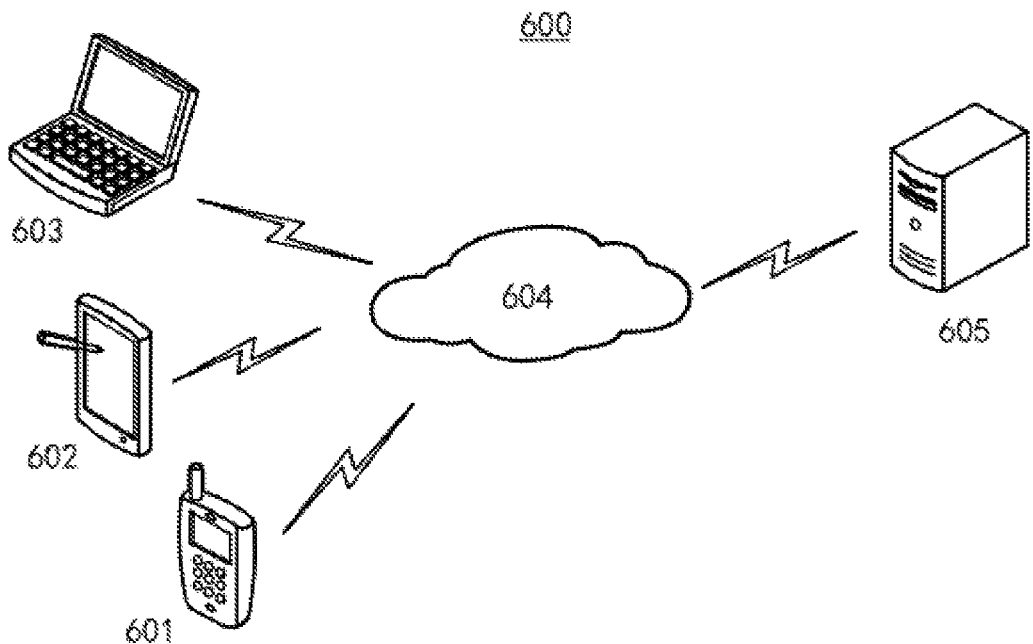
FIG. 6 schematically illustrates a system architecture suitable for a method for speech recognition according to an embodiment of the present application.

FIG. 6 schematically illustrates a system architecture suitable for a method for speech recognition according to an embodiment of the present application.

As shown in FIG. 6, the system architecture 600, suitable for a method for speech recognition according to an embodiment of the present application, includes terminals 601, 602, 603, a network 604, and a server 605. The network 604 serves as a medium for providing a communication link between the terminals 601, 602, 603 and the server 605. The network 604 may include various types of connections such as wired wireless communication links or fiber optic cables and the like.

The terminals 601, 602, 603 interact with the server 605 through the Network 604 to receive or transmit messages or the like. Various communication client applications may be installed on the terminals 601, 602, 603.

The terminals 601, 602, 603 may be electronic devices having a data acquisition function.

The server 605 may be a server providing various services. The server can analyze and process the received requests or messages, and feed back the data processing results to the terminal.

It should be noted that the method for speech recognition provided by the embodiments of the present application can generally be executed by the server 605. The method for speech recognition provided by embodiments of the present application may also be performed by a server or cluster of servers that is different from the server 605 and capable of communicating with the terminals 601, 602, 603 and/or the server 605.

It should be understood that the number of terminal devices networks and servers in FIG. 6 is only schematic. According to the implementation requirements, there may be any number of terminal devices, networks and servers.

Figure 7:
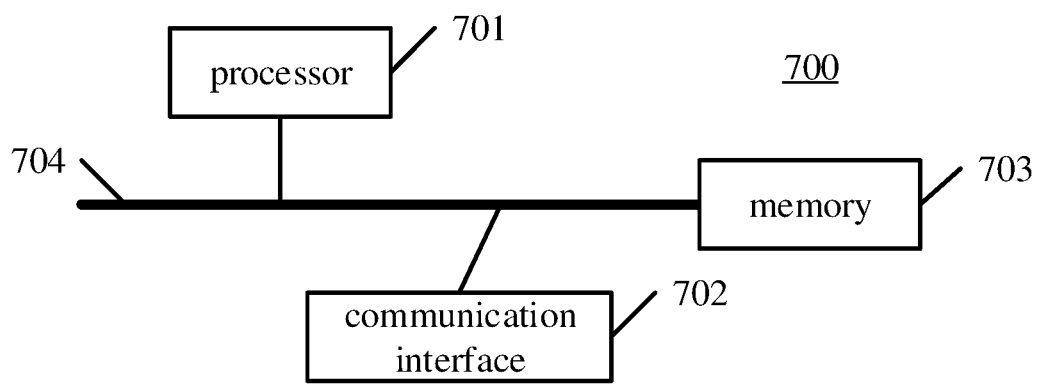
FIG. 7 schematically shows a structural block diagram of an electronic device provided by an embodiment of the present application.

FIG. 7 schematically shows a structural block diagram of an electronic device provided by an embodiment of the present application. As shown in FIG. 7, an electronic device 700 provided by an embodiment of the present application includes a processor 701, a communication interface 702, a memory 703, and a communication bus 704. The processor 701, the communication interface 702, and the memory 703 communicate with each other through the communication bus 704; The memory 703 is configured for storing at least one executable instruction; The processor 701 is configured for implementing the method for speech recognition described above when executing executable instructions stored on the memory.

Specifically, when implementing the model iteration method, the executable instructions make the processor execute the following steps:

performing encoded representation on an audio to be recognized to obtain an acoustic encoded state vector sequence of the audio to be recognized;

performing sparse encoding on the acoustic encoded state vector sequence of the audio to be recognized to obtain an acoustic encoded sparse vector;

determining a text prediction vector of each label in a preset vocabulary;

recognizing the audio to be recognized and determining a text content corresponding to the audio to be recognized according to the acoustic encoded sparse vector and the text prediction vector.

The memory 703 described above may be an electronic memory such as the flash memory, Electrically Erasable Programmable Read Only Memory (EEPROM), EPROM, hard disk or ROM. The memory 703 has a storage space for the program code for executing any of the method steps in the above-described method. For example, the storage space for program code may include individual program codes for implementing individual steps in the above method respectively. These program codes may be read from or written to one or more computer program products. These computer program products include program code carriers such as hard disks, optical disks (CD), memory cards, or floppy disks. Such computer program products are usually portable or fixed storage units. The memory unit may have a memory segment or a memory space or the like arranged similarly to the memory 703 in the above-described electronic device. The program code can be compressed, for example, in an appropriate form. Typically, the storage unit includes a program for performing the steps of the method according to an embodiment of the application, i.e., code that can be read by, for example, a processor such as 701, which, when run by an electronic device, causes the electronic device to perform the various steps in the method described above.

The embodiment of the disclosure also provides a computer-readable storage medium. The computer-readable storage medium stores a computer program that, when executed by a processor, may implement the method for training the speech recognition model and the method for speech recognition described above.

The computer-readable storage medium may be included in the device/apparatus described in the above embodiments; and it may also exist independently and not be assembled into the device/apparatus. The above-mentioned computer-readable storage medium carries one or more programs, and when the one or more programs are executed, the methods according to the embodiments of the disclosure may be implemented.

According to an embodiment of the application, The computer-readable storage medium may be a non-volatile computer-readable storage medium, for example, it may include, but is not limited to, portable computer disk, hard disk, random access memory (RAM), read only memory (ROM), erasable programmable read only memory (EPROM) or the flash memory, portable compact disk read only memory (CD-ROM), optical memory device, magnetic memory device or any suitable combination of the above. In the present disclosure, a computer-readable storage medium may be any tangible medium containing or storing a program that may be used by or in conjunction with an instruction execution system, apparatus or device.

Embodiments of the present disclosure provide that all or part of the above-mentioned technical solutions may be implemented in hardware, or in software modules running on one or more processors, or in combinations thereof. It will be understood by those skilled in the art that a microprocessor or a digital signal processor (DSP) may be used in practice to implement some or all of the functions of some or all of the components in an electronic device according to embodiments of the present application. Embodiments of the disclosure may also be implemented as apparatus or apparatus programs (e.g., computer programs and computer program products) for performing part or all of the methods described herein. A program implementing an embodiment of the disclosure may be stored on a computer-readable medium or may be in the form of one or more signals. Such a signal may be downloaded from an Internet site or provided on a carrier signal or in any other form.

It should be noted that relational terms such as "first" and "second" are used herein only to distinguish one entity or step from another and do not necessarily require or imply any such actual relationship or order between these entities or steps. Moreover, the terms "comprise", "include" or any other variation thereof are intended to encompass non-exclusive inclusion, so that a process, method, article or equipment that includes a set of elements includes not only those elements but also other elements that are not explicitly listed or are inherent to such a process, method, article or equipment. In the absence of further limitations, the elements defined by the phrase "including a . . . " do not exclude the existence of other identical elements in the process, method, article or equipment in which the elements are included.

The foregoing is only a specific embodiment of the disclosure to enable those skilled in the art to understand or practice the application. Various modifications to these embodiments will be apparent to those skilled in the art and the general principles defined herein may be implemented in other embodiments without departing from the spirit or scope of the disclosure. Accordingly the present disclosure will not be limited to the embodiments described herein but is intended to conform to the widest scope consistent with the principles and novel features applied herein.

What is claimed is:

1. A method for speech recognition, comprising:

performing encoded representation on an audio to be recognized to obtain an acoustic encoded state vector sequence of the audio to be recognized;

performing sparse encoding on the acoustic encoded state vector sequence of the audio to be recognized to obtain an acoustic encoded sparse vector;

determining a text prediction vector of each label in a preset vocabulary;

recognizing the audio to be recognized and determining a text content corresponding to the audio to be recognized according to the acoustic encoded sparse vector and the text prediction vector, wherein, performing sparse encoding on the acoustic encoded state vector sequence of the audio to be recognized to obtain the acoustic encoded sparse vector, comprises:

calculating a probability that each acoustic encoded state vector in the acoustic encoded state vector sequence is mapped to each label in the preset vocabulary, and determining a segmentation point according to the probability;

segmenting the acoustic encoded state vector sequence based on the segmentation point to obtain an acoustic encoded segmentation sequence;

performing sparse encoding on the acoustic encoded segmentation sequence to obtain the acoustic encoded sparse vector, wherein, the method further comprises performing sparse encoding on the acoustic encoded segmentation sequence to obtain the acoustic encoded sparse vector according to the following formula:

$$e_i = \text{Linear}(A_i)$$

$$\alpha_i = \exp(e_i) / \sum_{j=l}^{r} \exp(e_j)$$

$$\hat{A}_k = \sum_{t=l}^{r} \alpha_i A_t$$

wherein, $A_i$ represents the acoustic encoded segmentation sequence, Linear, represents a linear encoding function, $e_i$ represents an energy value of the acoustic encoded segmentation sequence after being encoded by the encoding function Linear, $\alpha_i$ represents a weight coefficient obtained by normalizing the energy value $e_i$, $e_j$ represents the energy value at time j, $A_t$ represents the acoustic encoded state vector at time t, $\hat{A}_k$ represents performing weighted sum on the acoustic encoded segmentation sequence according to the weight coefficient $\alpha_i$ to obtain the acoustic encoded sparse vector, k represents the k-th acoustic encoded segmentation sequence, and l and r respectively represent the starting time and the ending time of the acoustic encoded segmentation sequence.

2. The method according to claim 1, wherein performing encoded representation on the audio to be recognized to obtain the acoustic encoded state vector sequence of the audio to be recognized comprises:
  acquiring acoustic features of the audio to be recognized; and
  performing encoded representation on the acoustic features of the audio to be recognized to obtain the acoustic encoded state vector sequence of the audio to be recognized.

3. The method according to claim 1, wherein the label comprises a space label and a non-space label;
  calculating the probability that each acoustic encoded state vector in the acoustic encoded state vector sequence is mapped to each label in the preset vocabulary, and determining the segmentation point according to the probability comprises:
  performing linear mapping on each acoustic encoded state vector in the acoustic encoded state vector sequence, and determining the probability distribution of mapping the acoustic encoded state vector to each label in the preset vocabulary;
  determining the probability that the acoustic encoded state vector is mapped to a non-space label set according to the probability distribution; and
  determining the segmentation point according to the probability that the acoustic encoded state vector is mapped to the non-space label set.

4. The method according to claim 3, wherein determining the segmentation point according to the probability that the acoustic encoded state vector is mapped to the non-space label set comprises:
  marking the acoustic encoded state vector whose probability of the non-space label set is greater than a preset threshold value as a trigger peak; and
  marking the middle position of two adjacent trigger peaks as the segmentation point.

5. A system for speech recognition, comprising an acoustic encoder, a language predictor, a joint network and a sparse encoding layer;
  wherein, the acoustic encoder is configured for performing encoded representation on an audio to be recognized to obtain an acoustic encoded state vector sequence of the audio to be recognized;
  the sparse encoding layer is configured for performing sparse encoding on the acoustic encoded state vector sequence of the audio to be recognized to obtain an acoustic encoded sparse vector;
  the language predictor is configured for determining a text prediction vector of each label in a preset vocabulary;
  the joint network is configured for recognizing the audio to be recognized and determining a text content corresponding to the audio to be recognized according to the acoustic encoded sparse vector and the text prediction vector,
  wherein, the sparse encoding layer comprises a connectionist temporal classification (CTC) prediction layer and an acoustic state sparse layer;
  the CTC prediction layer is configured for calculating a probability that each acoustic encoded state vector in the acoustic encoded state vector sequence is mapped to each label in the preset vocabulary, and determining a segmentation point according to the probability;
  segmenting the acoustic encoded state vector sequence based on the segmentation point to obtain an acoustic encoded segmentation sequence;
  the acoustic state sparse layer is configured for performing sparse encoding on the acoustic encoded segmentation sequence to obtain the acoustic encoded sparse vector according to the following formula:

$$e_i = \text{Linear}(A_i)$$

$$\alpha_i = \exp(e_i)/\sum_{j=l}^{r}\exp(e_j)$$

$$\hat{A}_k = \sum_{t=l}^{r}\alpha_i A_t$$

wherein, $A_i$ represents the acoustic encoded segmentation sequence, Linear represents a linear encoding function, $e_i$ represents an energy value of the acoustic encoded segmentation sequence after being encoded by the encoding function Linear, $\alpha_i$ represents a weight coefficient obtained by normalizing the energy value $e_i$, $e_j$ represents the energy value at time j, $A_t$ represents the acoustic encoded state vector at time t, $\hat{A}_k$ represents performing weighted sum on the acoustic encoded segmentation sequence according to the weight coefficient $\alpha_i$ to obtain the acoustic encoded sparse vector, k represents the k-th acoustic encoded segmentation sequence, and l and r respectively represent the starting time and the ending time of the acoustic encoded segmentation sequence.

6. The system according to claim 5, wherein the acoustic encoder is further configured for: acquiring acoustic features of the audio to be recognized; performing encoded representation on the acoustic features of the audio to be recognized to obtain the acoustic encoded state vector sequence of the audio to be recognized.

7. The system according to claim 5, wherein the label comprises a space label and a non-space label; the CTC prediction layer is configured for:
  performing linear mapping on each acoustic encoded state vector in the acoustic encoded state vector sequence, and determining the probability distribution of mapping the acoustic encoded state vector to each label in the preset vocabulary;
  determining the probability that the acoustic encoded state vector is mapped to a non-space label set according to the probability distribution; and
  determining the segmentation point according to the probability that the acoustic encoded state vector is mapped to the non-space label set.

8. The system according to claim 7, wherein the CTC prediction layer is configured for:
  marking the acoustic encoded state vector whose probability of the non-space label set is greater than a preset threshold value as a trigger peak; and
  marking the middle position of two adjacent trigger peaks as the segmentation point.

9. An electronic device, comprising a processor, a communication interface, a memory and a communication bus, wherein the processor, the communication interface and the memory communicate with each other through the communication bus;

the memory is for storing at least one executable instruction, and the executable instruction makes the processor execute the following steps:

performing encoded representation on an audio to be recognized to obtain an acoustic encoded state vector sequence of the audio to be recognized;

performing sparse encoding on the acoustic encoded state vector sequence of the audio to be recognized to obtain an acoustic encoded sparse vector;

determining a text prediction vector of each label in a preset vocabulary;

recognizing the audio to be recognized and determining a text content corresponding to the audio to be recognized according to the acoustic encoded sparse vector and the text prediction vector, wherein, performing sparse encoding on the acoustic encoded state vector sequence of the audio to be recognized to obtain the acoustic encoded sparse vector, comprises:

calculating a probability that each acoustic encoded state vector in the acoustic encoded state vector sequence is mapped to each label in the preset vocabulary, and determining a segmentation point according to the probability;

segmenting the acoustic encoded state vector sequence based on the segmentation point to obtain an acoustic encoded segmentation sequence;

wherein, the method further comprises performing sparse encoding on the acoustic encoded segmentation sequence to obtain the acoustic encoded sparse vector according to the following formula:

$$e_i = \text{Linear}(A_i)$$

$$\alpha_i = \exp(e_i) / \sum_{j=l}^{r} \exp(e_j)$$

$$\hat{A}_k = \sum_{t=l}^{r} \alpha_i A_t$$

wherein, $A_i$ represents the acoustic encoded segmentation sequence, Linear represents a linear encoding function, $e_i$ represents an energy value of the acoustic encoded segmentation sequence after being encoded by the encoding function Linear, $\alpha_i$ represents a weight coefficient obtained by normalizing the energy value $e_i$, $e_j$ represents the energy value at time j, $A_t$ represents the acoustic encoded state vector at time t, $\hat{A}_k$ represents performing weighted sum on the acoustic encoded segmentation sequence according to the weight coefficient $\alpha_i$ to obtain the acoustic encoded sparse vector, k represents the k-th acoustic encoded segmentation sequence, and l and r respectively represent the starting time and the ending time of the acoustic encoded segmentation sequence.

10. A non-transitory computer-readable storage medium with a computer program stored thereon, wherein the computer program, when executed by a processor, implements steps of the method for speech recognition according to claim 1.

* * * * *